UNITED STATES PATENT OFFICE.

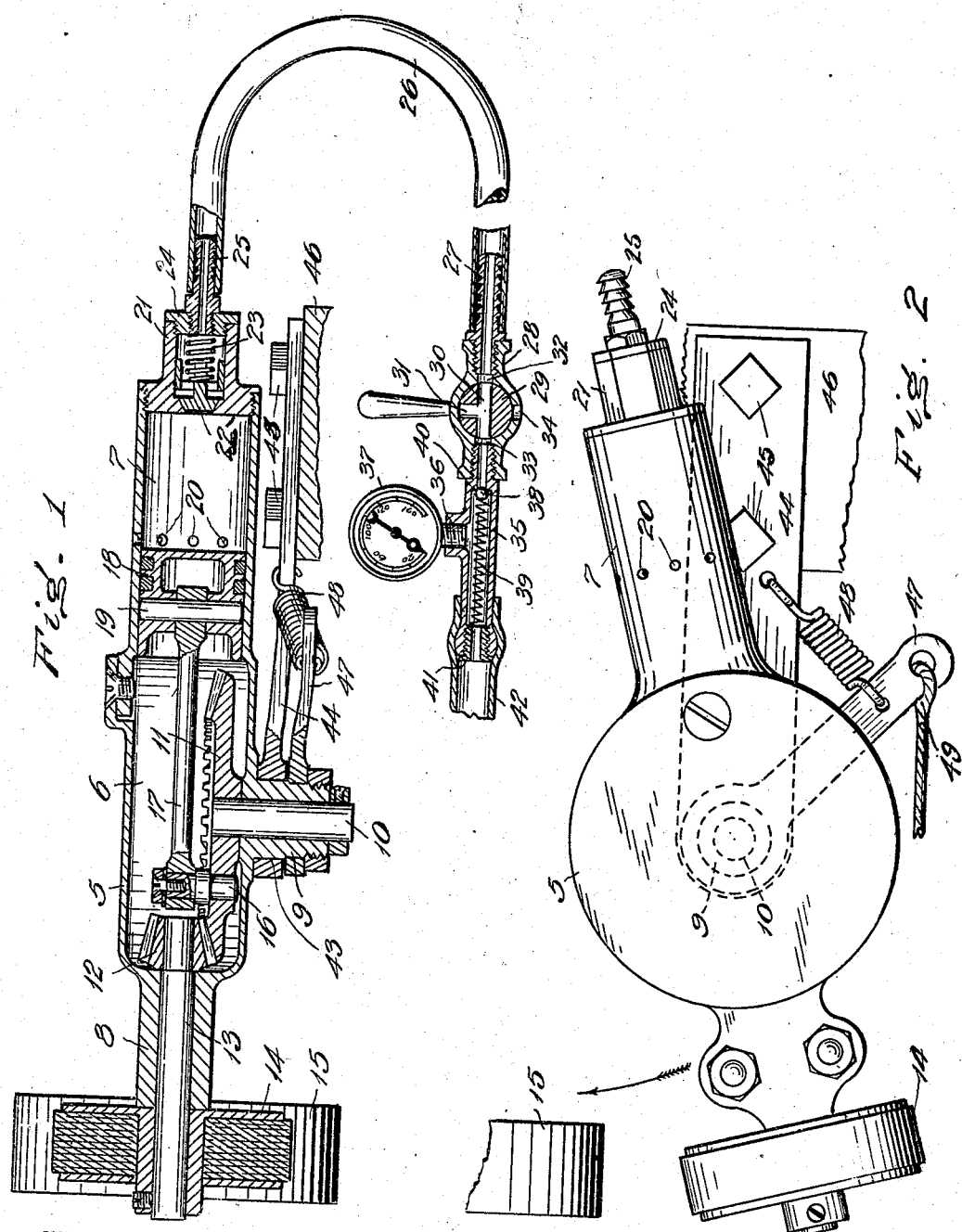

EDWARD J. ROHRBACHER, OF BLAINE, WASHINGTON.

AIR-COMPRESSOR.

936,813.   Specification of Letters Patent.   Patented Oct. 12, 1909.

Application filed January 4, 1909. Serial No. 470,714.

*To all whom it may concern:*

Be it known that I, EDWARD J. ROHRBACHER, citizen of the United States, residing at Blaine, in the county of Whatcom and State of Washington, have invented certain new and useful Improvements in Air-Compressors, of which the following is a specification.

This invention relates to that class of air pumps which is designed for use in inflating the tires of automobiles, for supplying air under pressure to operate a signal or whistle, or to afford pressure to a tank, as in marine work.

The object of the invention is the improvement in air pumps to adapt them to the above referred to services and to render them efficient in operation and conveniently controlled.

The invention consists, essentially, in a pump which is driven from the fly wheel of a motor through the medium of devices which are, upon occasion, frictionally engaged therewith and transmitted from such devices to the pump piston through positively acting elements embracing toothed gearing and a connecting rod which is actuated by a crank element.

The invention further consists in means for normally maintaining the pump and its operative connections in inoperative condition together with controlling devices for conveniently causing the same to be made operative.

The invention still further consists in devices for controlling the outflow of air from the pump to safeguard the apparatus against breakage and derangement as well as to lessen the duty devolving upon the pump when its services are not required and while the pump continues to operate.

The invention also consists in certain novel features of construction and organization, as hereinafter described and claimed, and for a full understanding of the invention reference is had to the accompanying drawings, in which—

Figure 1 is a view partly in vertical section and partly in elevation of devices embodying my invention. Fig. 2 is a plan view thereof but omitting the discharge connections from the pump.

The reference numeral 5 designates the machine frame having intermediately of its length a circular gear chamber 6 with a cylinder 7 and a shaft-bearing 8 upon diametrically opposite sides which are arranged to be in axial alinement with each other and perpendicular to the axis of said chamber. Integral with the frame and disposed concentrically of the chamber axis is a trunnion 9 which is bored to provide a journal bearing for the shaft 10 of a bevel toothed wheel 11 positioned within said chamber and in mesh with a toothed bevel-pinion 12. The latter is fixedly connected to or made integral with a shaft 13 which is journaled in the bearing 8 and carries upon the outer end a pulley 14 arranged for being frictionally engaged with the periphery of a driving wheel 15, which may be the fly-wheel of an internal combustion engine.

The gear wheel 11 is provided with a stud 16 which is offset from the shaft 10 to serve as a crank to impart reciprocating movements through a connecting rod 17 to the piston 18 of the aforesaid cylinder 7. This piston is desirably of the type usually employed in gas engines and similarly thereto is provided with a cross-head pin 19 for direct connection with the rod 17. Air inlet openings 20 are provided in the cylinder wall and located so as to be uncovered by the piston when the latter is at the end of its inoperative stroke, or into the position in which it is represented in Fig. 1. The outlet port of the pump is through the cylinder head 21 which is chambered for the reception of a valve 22 which opens outwardly against the power of spring 23 tending to maintain the valve in closed condition and the nonreturn of the discharged air to the cylinder. For convenience in manufacture, the chamber of the cylinder-head is provided with a removable cap 24 whereinto is screwed a nipple 25 to serve as a connection with a length of flexible tubing, or hose, 26 which in turn is connected at its other end by a like nipple 27 with the casing 28 of a "threeway" valve 29. This valve is of the ordinary construction of such class and is provided with a straight passage 30 and a branch passage 31 and is accordingly adapted to make communication between oppositely arranged ports 32, 33 afforded by the valve casing, or between the port 32 and an escape outlet 34 in the casing. In the drawing the valve is illustrated to be in the first of such assumed conditions. Secured to the valve casing and communicating with its port 33 is a T-fitting 35 having a side outlet 36 whereat is attached a pressure gage 37. Within the main portion of the fitting 35 is a check valve opposing the backflow of air received from the pump and may be comprised of a ball 38 which is yieldingly held by a spring 39 against an annular shoulder 40 provided within the fitting 35 in proximity to the aforesaid three-way valve. At the outer extremity of the said fitting 35 is a removable apertured plug 41 to permit the flow of air therethrough and likewise the introduction of the ball and its spring to within the fitting. This fitting is also adapted, as by the provision of a bulb-shaped outer form, for connection with another hose 42 for conducting compressed air to a tank, tire, or other receptacle which it is desired to supply with such a medium.

The referred to trunnion 9 of the frame is fitted within an opening 43 of a bracket member 44 which is rigidly secured, as by bolts 45, to a part, as indicated by 46, of the platform or structure which is rigidly connected with the motor from which the pump derives its actuating power.

Connected fixedly to the frame trunnion 9 is an arm 47 whereby the frame 5 is influenced to swing the friction pulley 14 into operative engagement with the motor wheel 15 and in opposition to a helical spring 48 connecting said arm to a stationary object, as, for example, to the bracket member. Motion may be given to the arm 47 to effect the aforesaid swing of the frame by any appropriate controlling devices, as through the agency of a draw-line 49 (shown in Fig. 2) which is led to within convenient reach of the operator.

To operate the pump the frame 5 is caused to swing in the direction indicated by the arrow in Fig. 2 by an exertion of force through the arm 47 to overcome the power of the spring 48. This movement of the frame carries the pulley 14 into frictional engagement with the driving wheel 15 and rotates the pulley together with the shaft 13 and the pinion 12, which being in mesh with the gear 11, rotates the latter. The crank pin 16 is thus revolved and through the connecting rod 17 actuates the piston 18 to create a compression of atmospheric air which is alternately drawn into the cylinder through the openings 20 and discharged through the end of the cylinder into the tube 26 where it passes through the valve 29 to the hose connection 42 to be utilized. In taking the aforesaid course the pressure of the air dislodges the non-return valves 22 and 38 but is prevented thereby from flowing in a reverse direction. The gage 37 meanwhile is affected to register the pressure of the air in the delivery passage and when a sufficient quantity of air is delivered and has accumulated at the desired pressure, as may be ascertained from an inspection of the gage, the valve 29 is manipulated to cause the branch passage 31 and the straight passage 30 to respectively register with the openings 32 and 34 in the valve casing whereupon the discharge from the pump is had into the atmosphere until the arm 47 is released so that the spring 48 can assert itself to separate the pulley 14 from the driver 15. This function of the invention is especially valuable as a safeguard against breakage or, at least, a resistant force which would otherwise act against the piston due to a continuance of the building up of a superfluous pressure subsequent to the obtaining of a supply of compressed air to meet the demand.

The apparatus is readily coupled in place; it occupies a relatively small space; can be conveniently attended to; and at all times is under the control of the operator as to starting, rate of operation, and facility in discontinuing the supply of compressed air either by means of the three-way valve or by the disassociation of the frictional driving elements which actuate the pump.

What I claim, is—

1. A pump, comprising in combination with a power-wheel, a pump-casing having a piston therein, a gear-casing adjoining said pump-casing at one end, a gear mounted in one side of said gear-casing at right angles to said piston, a crank shaft operatively connecting said gear and said piston, a shaft entering said gear-casing, and being adapted to coöperate with said power-wheel, a bevel-gear mounted on said shaft and in mesh with said gear, said gear casing being pivoted axially with said gear, and a spring actuated lever normally holding said shaft away from said power-wheel.

2. A pump, comprising in combination with a power-wheel, a pump-casing having a piston therein, a gear casing adjoining said pump-casing at one end, a gear mounted in one side of said gear-casing at right angles to said piston, a crank-shaft operatively connecting said gear and said piston, a shaft entering said gear-casing, and being adapted to coöperate with said power-wheel, a bevel-gear mounted on said shaft and in mesh with said gear, said gear casing being pivoted axially with said gear, and a lever fixed upon the axis of said gear, and being adapted to normally hold said shaft away from said power-wheel.

3. A pump, comprising in combination with a power-wheel, a pump-casing having a piston therein, a gear casing adjoining said pump-casing at one end, a gear mounted in one side of said gear-casing at right angles to said piston, a crank-shaft operatively connecting said gear and said piston, a shaft entering said gear-casing, and being adapted to coöperate with said power-wheel, a bevel gear mounted on said shaft and in mesh with said gear, said shaft, gear-casing and pump-casing forming a rigid structure and being pivotally mounted on the axis of said gear, and being adapted to be swung into and out of operative engagement with said power-wheel at will.

EDWARD J. ROHRBACHER.

Witnesses:
 PIERRE BARNES,
 LOUIS EBBE.